(12) United States Patent
Cho et al.

(10) Patent No.: US 11,599,491 B2
(45) Date of Patent: Mar. 7, 2023

(54) SYSTEM ON CHIP HAVING SEMAPHORE FUNCTION AND METHOD FOR IMPLEMENTING SEMAPHORE FUNCTION

(71) Applicant: Samsung Electronics Co., Ltd., Suwon-si (KR)

(72) Inventors: DongSik Cho, Yongin-si (KR); Jeonghoon Kim, Yongin-si (KR); Rohitaswa Bhattacharya, Suwon-si (KR); Jaeshin Lee, Seoul (KR); Honggi Jeong, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/376,590

(22) Filed: Jul. 15, 2021

(65) Prior Publication Data

US 2021/0342283 A1 Nov. 4, 2021

Related U.S. Application Data

(63) Continuation of application No. 16/821,289, filed on Mar. 17, 2020, now Pat. No. 11,080,220, which is a continuation of application No. 16/192,019, filed on Nov. 15, 2018, now Pat. No. 10,678,728, which is a continuation of application No. 15/899,877, filed on Feb. 20, 2018, now Pat. No. 10,176,136, which is a continuation of application No. 14/877,653, filed on Oct. 7, 2015, now Pat. No. 9,940,278.

(30) Foreign Application Priority Data

Nov. 10, 2014 (KR) .................. 10-2014-0155558

(51) Int. Cl.
*G06F 13/364* (2006.01)
*G06F 13/40* (2006.01)

(52) U.S. Cl.
CPC ........ *G06F 13/4004* (2013.01); *G06F 13/364* (2013.01); *Y02D 10/00* (2018.01)

(58) Field of Classification Search
None
See application file for complete search history.

(56) References Cited

U.S. PATENT DOCUMENTS

| 5,303,344 | A | 4/1994 | Yokoyama et al. |
| 5,440,752 | A | 8/1995 | Lentz et al. |
| 5,557,783 | A | 9/1996 | Oktay et al. |
| 5,572,734 | A | 11/1996 | Narad et al. |

(Continued)

FOREIGN PATENT DOCUMENTS

| JP | 2004-252670 A | 9/2004 |
| JP | 2006-119300 A | 5/2006 |

(Continued)

*Primary Examiner* — Michael Sun
(74) *Attorney, Agent, or Firm* — Harness, Dickey & Pierce, P.L.C.

(57) ABSTRACT

A system on chip, semiconductor device, and/or method are provided that include a plurality of masters, an interface, and a semaphore unit. The interface interfaces the plurality of masters with a slave device. The semaphore unit detects requests of the plurality of masters, controlling the salve device, about an access to the interface and assigns a semaphore about each of the plurality of masters by a specific operation unit according to the detection result.

20 Claims, 12 Drawing Sheets

(56) References Cited

U.S. PATENT DOCUMENTS

| | | | |
|---|---|---|---|
| 5,649,209 A | 7/1997 | Umetsu et al. | |
| 5,717,873 A | 2/1998 | Rabe et al. | |
| 5,758,105 A * | 5/1998 | Kelley | G06F 13/364 710/241 |
| 5,872,980 A | 2/1999 | Derrick et al. | |
| 6,253,268 B1 | 6/2001 | Bjorkengren et al. | |
| 6,574,688 B1 | 6/2003 | Dale et al. | |
| 7,315,913 B2 | 1/2008 | Takizawa | |
| 7,428,607 B2 * | 9/2008 | Edirisooriya | G06F 13/4031 710/111 |
| 8,087,020 B2 | 12/2011 | Kanai et al. | |
| 8,274,972 B2 | 9/2012 | Park | |
| 8,487,655 B1 | 7/2013 | Kutz et al. | |
| 8,676,273 B1 | 3/2014 | Fujisaki | |
| 9,432,298 B1 | 8/2016 | Smith | |
| 10,339,085 B2 * | 7/2019 | Cho | G06F 13/24 |
| 2006/0026329 A1 * | 2/2006 | Yu | G06F 13/364 710/309 |
| 2006/0085587 A1 | 4/2006 | Takizawa | |
| 2007/0016708 A1 | 1/2007 | Park | |
| 2008/0056278 A1 * | 3/2008 | Kadambi | H04L 47/50 370/395.53 |
| 2008/0059668 A1 | 3/2008 | Charrat et al. | |
| 2009/0044188 A1 | 2/2009 | Kanai et al. | |
| 2009/0055005 A1 * | 2/2009 | Oxman | G10L 19/16 712/36 |
| 2009/0113097 A1 | 4/2009 | Drerup et al. | |
| 2009/0157936 A1 | 6/2009 | Goss et al. | |
| 2010/0332690 A1 | 12/2010 | Kawamura et al. | |
| 2011/0093857 A1 * | 4/2011 | Sydow | G06F 9/3851 718/100 |
| 2011/0265093 A1 | 10/2011 | Nakahara et al. | |
| 2013/0125117 A1 * | 5/2013 | Niesser | G06F 9/45533 718/1 |
| 2013/0275686 A1 | 10/2013 | Park et al. | |
| 2014/0006644 A1 | 1/2014 | Pullagoundapatti et al. | |
| 2014/0082624 A1 | 3/2014 | Iwabuchi | |
| 2015/0019803 A1 * | 1/2015 | Miller | G06F 3/0685 711/125 |
| 2015/0039865 A1 | 2/2015 | Ishigooka et al. | |
| 2015/0134883 A1 | 5/2015 | Lin | |
| 2016/0217090 A1 | 7/2016 | Sengoku et al. | |

FOREIGN PATENT DOCUMENTS

| | | |
|---|---|---|
| JP | 2008-147205 A | 6/2008 |
| JP | 2010026575 A | 2/2010 |
| JP | 2013097544 A | 5/2013 |
| JP | 2013171547 A | 9/2013 |
| KR | 10-2007-0009250 A | 1/2007 |
| KR | 10-2007-0084362 A | 8/2007 |

* cited by examiner

SYSTEM ON CHIP HAVING SEMAPHORE FUNCTION AND METHOD FOR IMPLEMENTING SEMAPHORE FUNCTION

CROSS-REFERENCE TO RELATED APPLICATIONS

This application is a continuation of U.S. application Ser. No. 16/821,289, filed on Mar. 17, 2020, which is a continuation of U.S. application Ser. No. 16/192,019, filed on Nov. 15, 2018, now granted as U.S. Pat. No. 10,678,728 on Jun. 9, 2020, which is a continuation of U.S. application Ser. No. 15/899,877, filed on Feb. 20, 2018, now granted as U.S. Pat. No. 10,176,136 on Jan. 8, 2019, which is a continuation of U.S. application Ser. No. 14/877,653, filed on Oct. 7, 2015, now granted as U.S. Pat. No. 9,940,278 on Apr. 10, 2018, which claims priority under 35 U.S.C. § 119 to Korean Patent Application No. 10-2014-0155558, filed Nov. 10, 2014, in the Korean Intellectual Property Office, the entire contents of each of which are hereby incorporated in their entirety by reference.

BACKGROUND

Example embodiments of the inventive concepts described herein relate to a semiconductor device, and more particularly, relate to a device and/or system on chip implemented with hardware having a semaphore function and/or a method for setting a semaphore.

In recent years, the use of mobile devices, such as a smart phone, a tablet PC, a digital camera, an MP3 player, and a PDA has explosively increased. In such mobile devices, driving of multimedia and throughput of various data has increased, and high-speed processors and mass storage mediums are used. A variety of application programs are driven on the mobile device. The mobile device may use semiconductor devices, such as a working memory (e.g., DRAM), a nonvolatile memory, and an application processor (hereinafter referred to as "AP"), to drive various application programs. Also, a communication processor (hereinafter referred to as "CP") is used for a communication function. The AP and the CP that are driven by different operating systems may be often implemented in a system on chip. In at least one example embodiment, a plurality of master devices, such as the AP and the CP, may share one slave device. In particular, one slave device may be shared through one interface that allows multi-master setting. In this case, a method for sharing one slave device through one interface may be implemented using a "semaphore".

However, the implementing of the semaphore for controlling a single slave through one interface needs a lot of software resources and increases complexity. Also, a waiting time of any master has to be fixed for scheduling of a real-time operating system at a software level. In addition, it is necessary to reduce the fixed waiting time for a fast response. As the waiting time is defined at the software level, it is difficult to secure the fast response and relatively high complexity of software.

SUMMARY

Some example embodiments of the inventive concepts provide a system on chip capable of sharing an interface without software interference by implementing a semaphore in hardware.

One aspect of the example embodiments of the inventive concepts are directed towards providing a system on chip which includes a plurality of masters (e.g., master devices), an interface, and a semaphore unit (i.e., a semaphore logic circuit). The interface may interface the plurality of masters with a slave device. The semaphore logic circuit may detect at least one access request from the plurality of masters, the access request indicating a request to access to the interface and to control the slave device, and may assign a semaphore to one of the plurality of masters for a desired operational period according to the detection result.

According to at least one example embodiment, the desired operational period may correspond to a duration for the interface to send a plurality of transactions to the slave device, the transactions including command or control signals.

According to at least one example embodiment, the semaphore logic circuit may further include a plurality of atomic sequencers configured to receive access requests from the masters, and in response to the access requests, the atomic sequencers transmit a request to acquire a semaphore for the interface; and a semaphore controller configured to assign the semaphore to one of the atomic sequencers in response to the received request to acquire the semaphore by the atomic sequencers.

According to at least one example embodiment, each of the atomic sequencers may send transactions for access to the interface until the semaphore is assigned.

According to at least one example embodiment, the semaphore controller may assign the semaphore to an atomic sequencer corresponding to a first transaction received by the interface, from among the transactions sent by the atomic sequencers.

According to at least one example embodiment, the atomic sequencer to which the semaphore is assigned may release the assigned semaphore when an exchange of at least one transaction corresponding to the desired operational period is completed.

According to at least one example embodiment, the semaphore controller may manage semaphore bits for assigning the semaphore to one of the atomic sequencers.

According to at least one example embodiment, the atomic sequencers may issue interrupts to corresponding masters when an exchange of transactions of the desired operational period is completed.

According to at least one example embodiment, the atomic sequencers may be configured to manage accesses of corresponding masters to the interface.

According to at least one example embodiment, the masters may be processors, and each processor may be driven by an operating system, the operating systems of each processor having different attributes.

According to at least one example embodiment, the interface may be an I2C (Inter-Integrated Circuit) interface.

Another aspect of example embodiments of the inventive concepts are directed to provide a semaphore assigning method of an interface which interfaces a plurality of masters with a slave device. The multi-master-based semaphore assigning method may include receiving access requests for the interface from the masters, sending a first transaction to the interface in response to an access request received from a master, detecting whether the interface received the first transaction; when the first transaction is received, assigning the semaphore to a first master, of the plurality of masters, corresponding to the first transaction and performing an atomic sequence for sending the received access request to the slave device, and releasing the semaphore assigned to the first master when the atomic sequence is completed.

According to at least one example embodiment, the method may include sending an interrupt to the first master when the atomic sequence is completed.

According to at least one example embodiment, the atomic sequence may include a plurality of transactions for programming or reading a register of the interface to send the received access request from the interface to the slave device.

According to at least one example embodiment, the detecting may include, if the first transaction is rejected by the interface, the semaphore is not assigned to the first master and the first transaction is sent again to the interface.

According to at least one example embodiment, the releasing of the semaphore may include reading a register corresponding to a specific address from among a plurality of control registers of the interface.

According to at least one example embodiment, the method may further include detecting a read operation associated with the register corresponding to the specific address, and releasing the semaphore assigned to the first master.

Still another aspect of example embodiments of the inventive concepts are directed to provide a system on chip which may include an application processor configured to access a slave device, a communication processor configured to access the slave device, an interface, and a semaphore logic circuit. The interface may connect with the application processor and the communication processor and with an external device configured to act as the slave. The semaphore logic circuit may detect a request of the application processor or the communication processor for access to the interface and may assign a priority to the interface to the application processor or the communication processor for a desired operational period according to the detection result.

According to at least one example embodiment, the external device may be a power management integrated circuit.

According to at least one example embodiment, the semaphore logic circuit may include a first atomic sequencer configured to receive a request of the application processor about an access to the interface to acquire a priority to the interface, a second atomic sequencer configured to receive a request of the communication processor for access to the interface to acquire a priority about the interface, a semaphore controller configured to detect accesses of the first and second atomic sequencers to the interface to assign or release the priority with respect to one of the first and second atomic sequencers.

According to at least one example embodiment, the specific operation unit may correspond to a plurality of transactions that allows the interface to send a command or a control signal corresponding to the request and is exchanged between the first or second atomic sequencer and the interface.

According to at least one example embodiment, an access attempt of the first atomic sequencer or the second atomic sequencer may include a transfer of a first transaction of transactions constituting the specific operation unit.

According to at least one example embodiment, the semaphore controller may assign the priority to an atomic sequencer corresponding to one, received by the interface, from among first transactions that the first and second atomic sequencers send, respectively.

According to at least one example embodiment, the atomic sequencer to which the semaphore is assigned may release the acquired priority about the interface when a plurality of transactions corresponding to the specific operation unit is completed.

According to at least one example embodiment, the first atomic sequencer or a second atomic sequencer may issue an interrupt to the application processor or the communication processor when an exchange of a plurality of transactions corresponding to the specific operation unit is completed.

According to at least one example embodiment, a time taken to execute the specific operation unit may be fixed.

According to at least one example embodiment, the interface may correspond to at least one of an I2C (Inter-Integrated Circuit) interface protocol, an UART (Universal Asynchronous Receiver Transmitter) protocol, SPI (Serial Peripheral Interface) protocol, and HSIC (High-Speed Inter-Chip) protocol.

Still another aspect of example embodiments of the inventive concepts may be directed to a system, where the system may include a plurality of master devices configured to access at least one slave device, the plurality of master devices including at least a first master device and a second master device, an interface configured to provide communication between the slave device and the master devices, and a controller configured to grant access to the slave device to the first master device upon receiving a first access request from the first master device and a second access request from the second master device.

According to at least one example embodiment, the controller may be configured to grant access to the slave device to the second master device after a desired period.

According to at least one example embodiment, the first access request may include at least one transaction from the first master device for the slave device, and the desired period may be based on a time to complete the at least one transaction.

According to at least one example embodiment, if the second master device is not granted access to the slave device, the second master device may resend the second access request.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
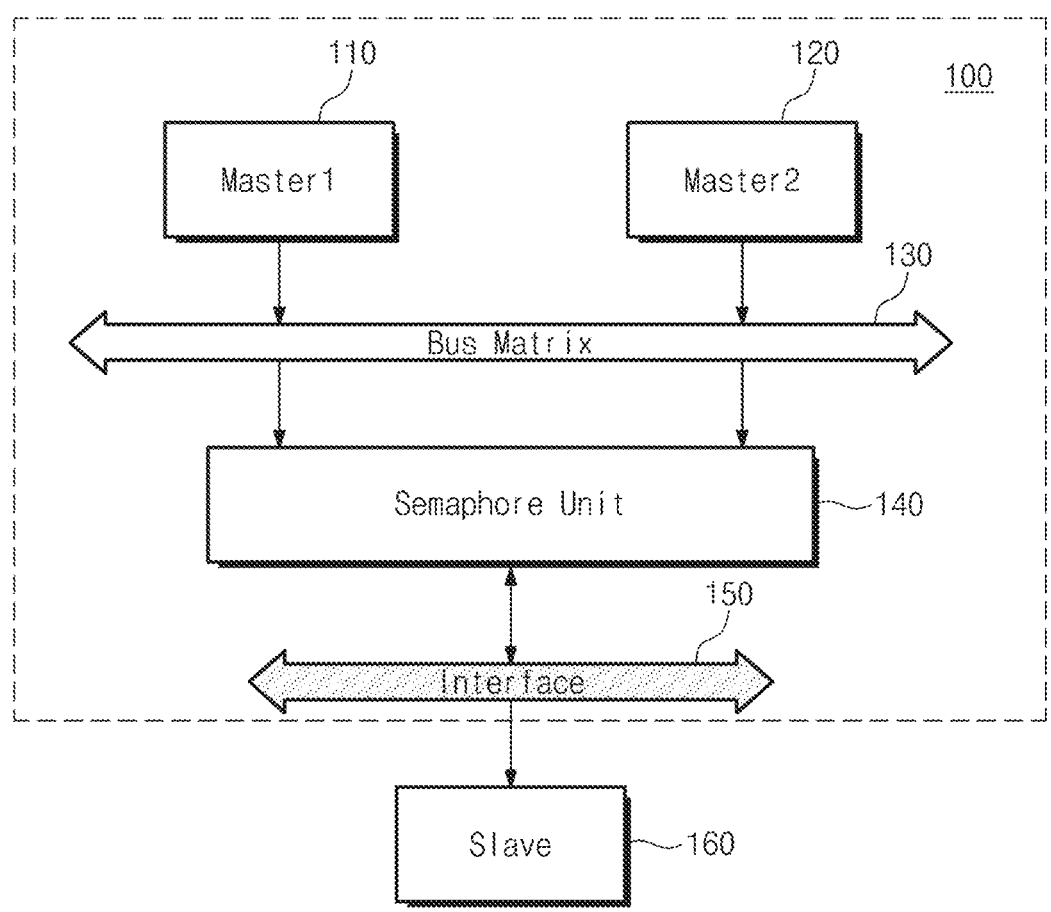
FIG. 1 is a block diagram schematically illustrating a system on chip according to at least one example embodiment.

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

In example embodiments, a nonvolatile memory may be embodied to include a three dimensional (3D) memory array. The 3D memory array may be monolithically formed on a substrate (e.g., semiconductor substrate such as silicon, or semiconductor-on-insulator substrate). The 3D memory array may include two or more physical levels of memory cells having an active area disposed above the substrate and circuitry associated with the operation of those memory cells, whether such associated circuitry is above or within such substrate. The layers of each level of the array may be directly deposited on the layers of each underlying level of the array.

In example embodiments, the 3D memory array may include vertical NAND strings that are vertically oriented such that at least one memory cell is located over another memory cell. The at least one memory cell may comprise a charge trap layer.

The following patent documents, which are hereby incorporated by reference in their entirety, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

A system on chip according to some example embodiments of the inventive concepts may contain an Inter-Integrated Circuit (I2C) as a bus interface for allowing a plurality of masters (or, master devices) to share at least one slave (or, slave device). The bus interface may be implemented with the following inter-chip interfaces including the I2C interface: UART (Universal Asynchronous Receiver Transmitter), SPI (Serial Peripheral Interface), HSIC (High-Speed Inter-Chip), etc.

FIG. 1 is a block diagram schematically illustrating a system on chip according to some example embodiments of the inventive concepts. Referring to FIG. 1, a system on chip 100 includes at least masters 110 and 120, a bus matrix 130, a semaphore unit 140, and an interface 150. The masters 110 and 120 of the system on chip 100 may access a slave device 160 through the semaphore unit 140. The semaphore unit 140 may also be referred to as a semaphore logic circuit. Here, the slave device 160 may be a semiconductor device, or the like, that is placed outside the system on chip 100. However, it is comprehended that the slave device 160 is an intellectual property (IP) block implemented in the system on chip 100. Additionally, while certain example embodiments may illustrate the use of a system on chip, the example embodiments are not limited thereto, and the inventive concepts discussed herein may be applied to any other type of processing device and/or processing system.

The first master 110 and the second master 120 may be processors, or other processing devices, that are driven by operating systems having different attributes, or the same attributes. For example, the first master 110 may be a processor that is driven by a real-time operating system, and the second master 120 may be a processor that is driven by a non-real-time operating system. In the first master 110 driven by the real-time operating system, it may be necessary to minimize a waiting time upon accessing the slave device 160. In addition, it may be necessary to set a time when the second master 120 driven by the non-real-time operating system occupies the interface 150, to a fixed and/or desired value. That is, it may be necessary to predict a time when the second master 120 driven by the non-real-time operating system occupies the interface 150, for scheduling purposes of the first master 110. Since the second master 120 driven by the non-real-time operating system does not guarantee a worst waiting time, scheduling of the first master 110 driven by the real-time operating system may be difficult. Thus, as a hardware component, the semaphore unit 140 is included which arbitrates sharing of the interface 150 between masters sharing one interface.

The bus matrix 130 may be a system bus for providing an on-chip network in the system on chip 100. The bus matrix 130 may include a data bus, an address bus, and a control bus, for example. The data bus may be a channel where data is transferred. The data bus may be mainly used as a memory access channel to a working memory (not shown) or a storage device (not shown). The address bus may be a channel for exchanging addresses between IP blocks. The control bus may be a channel where control signals are transferred between IP blocks. However, a configuration of the bus matrix 130 is not limited to the above description. For example, the bus matrix 130 may further include various arbitration methods for efficient management of various computer resources and/or components. For example, the first master 110 and the second master 120 access the slave device 160 through the bus matrix 130.

The semaphore unit 140 may be implemented with hardware that allows a plurality of masters to share a single internal bus, the interface 150 without conflict. For example, the semaphore unit 140 postpones accessing of the interface 150 by the second master 120 while the first master 110 occupies the interface 150. That is, during a critical section where the first master 110 writes or reads a register of the interface 150, the semaphore unit 140 postpones an access of the second master 120. The semaphore unit 140 assigns the priority of the interface 150 to the second master 120 after the critical section of the first master 110 is terminated. Below, the above-described critical section is referred to as an "atomic sequence". Since the second master 120 operating on a non-real-time operating system does not guarantee a worst case waiting time, it is difficult and/or impossible for the first master to control the slave device 160 in real time. The semaphore unit 140 may assign the occupying of the interface 150 between masters by the desired, reduced and/or minimum operation.

The interface 150 may be implemented with a bus interface that allows the masters 110 and 120 to share at least one slave 160. For example, the interface 150 may be implemented with an I2C interface for interfacing the system on chip 100 with an external device. The I2C interface may be a bus interface that includes one serial data line SDA and one serial clock line SCL and supports bidirectional communication. In the I2C interface protocol, the communication counterpart may be decided when a bus master appoints a unique address of the communication counterpart.

The I2C interface uses a serial data line SDA to which a pull-up resistor is connected and a bidirectional open collector line of a serial clock line SCL. In the I2C interface protocol, there is reserved a portion of a 7-bit address space. When an access to the slave device 160 is requested, the masters 110 and 120 may program a register of the I2C interface through the semaphore unit 140. As the register is programmed, the I2C interface may control the slave device 160 using the serial data line SDA and the serial clock line SCL.

The protocol of the interface 150 may be replaced with the following protocols including the I2C interface protocol: UART (Universal Asynchronous Receiver Transmitter), SPI (Serial Peripheral Interface), HSIC (High-Speed Inter- Chip), etc. The interface 150 makes it possible to exchange data with any device designated by the bus master. Also, since the protocol of the interface 150 defines mechanisms for avoiding bus competition, a randomly designated device may operate as a master. Thus, in a system using the interface 150, at least one slave device 160 may be shared by multiple master devices.

The slave device 160 is shared by the masters 110 and 120 that are driven by operating systems having different attributes, or the same attributes. That is, the slave device 160 may be a separate semiconductor chip that is connected without the outside of the system on chip 100. The slave device 160 may communicate with the system on chip 100 through the interface 150 that is implemented in the system on chip 100. However the slave device 160 can be understood as an IP block of the system on chip 100, or other semiconductor device, connected with the interface 150.

According to the above-described system on chip 100, there is included the semaphore unit 140 to perform a semaphore operation that allows masters to share one slave. The semaphore unit 140 assigns the semaphore of the interface 150 to one of masters by the critical section. Here, the critical section may correspond to an atomic sequence according to some example embodiments of the inventive concepts and may be relevant to a unit of a set of register access operations. A time when any one master occupies the interface 150 may be restricted and determined and/or fixed by intervention of the semaphore unit 140, and occupation (i.e. control, usage, etc.) of the interface 150 is released when the fixed occupation time passes. Thus, at a time when any one master occupies the interface 150 is predicted, it is possible to provide facility of scheduling to a master necessitating real-time control of the slave device 160.

Figure 2:
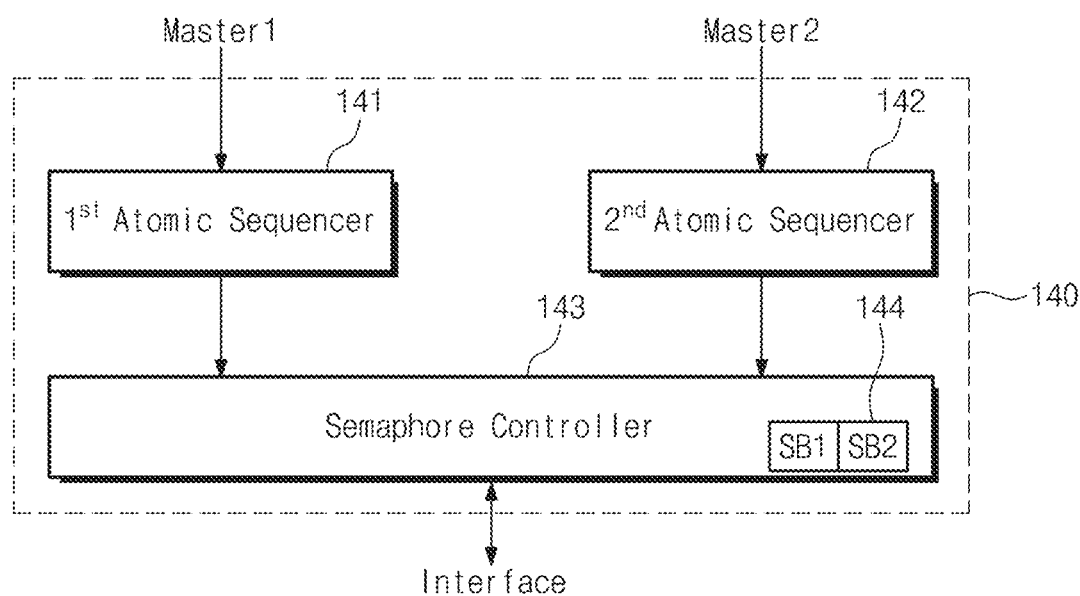
FIG. 2 is a block diagram schematically illustrating a semaphore unit shown in FIG. 1, according to at least one example embodiment.

FIG. 2 is a block diagram schematically illustrating a semaphore unit 140 shown in FIG. 1, according to at least one example embodiment of the inventive concepts. Referring to FIG. 2, a semaphore unit 140 includes at least atomic sequencers 141 and 142 corresponding to masters and a semaphore controller 143.

The first atomic sequencer 141 manages a request of the first master 110 for access to an interface 150. That is, the first atomic sequencer 141 detects an access request regarding the interface 150 that is issued from the first master 110. In the event that the first master 110 requests an access to the interface 150, the first atomic sequencer 141 sends a first transaction to the interface 150 to acquire the semaphore. If the semaphore is assigned to the first atomic sequencer 141, the first atomic sequencer 141 performs the atomic sequence that is a desired, reduced and/or minimum operation unit (e.g., a desired operational period) about an access to the interface 150. When the atomic sequence about the interface 150 is terminated, the first atomic sequencer 141 sets and/or transmits a signal/command to the semaphore controller 143 to release the acquired semaphore.

The second atomic sequencer 142 manages a request of the second master 120 about an access to the interface 150. In the event that the second master 120 requests an access to the interface 150, the second atomic sequencer 142 sends a first transaction to the interface 150 to acquire the semaphore. The first transaction may be received or rejected by the interface 150. If the semaphore is assigned to the second atomic sequencer 142 by the first transaction, the second atomic sequencer 142 performs the atomic sequence. When the atomic sequence about the interface 150 is terminated, the second atomic sequencer 142 releases the acquired semaphore. The first and second atomic sequencers 141 and 142 may share the interface 150 by the atomic sequence according to a semaphore function that the semaphore controller 143 provides.

The semaphore controller 143 detects the first transaction issued from the first and second atomic sequencers 141 and 142 to assign the semaphore. In the event that the semaphore is not assigned to any one of the first and second atomic sequencers 141 and 142, the semaphore controller 143 may assign the semaphore to an atomic sequencer that sends the first transaction. In the event that the semaphore is assigned, the semaphore controller 143 maintains a semaphore assignment state until an atomic sequence is terminated. For example, if the semaphore is occupied by the first atomic sequencer 141, the semaphore controller 143 does not change the assignment state of the semaphore even though a transaction is sent from the second atomic sequencer 142. The assignment state of the semaphore may be changed when an atomic sequence performed by the first atomic sequencer 141 is terminated.

The semaphore controller 143 manages a semaphore bit value 144 for semaphore assignment. That is, the semaphore controller 143 sets a semaphore bit SB1 indicating a semaphore assignment state about the first atomic sequencer 141 and a semaphore bit SB2 indicating a semaphore assignment state about the second atomic sequencer 142, respectively. For example, the semaphore bit value 144 may be set to "00" when semaphores of the first and second atomic sequencers 141 and 142 are all released. The semaphore bit value 144 may be set to "10" when the semaphore is assigned to the first atomic sequencer 141 and to "01" when the semaphore is assigned to the second atomic sequencer 142. The setting of the semaphore bit value 144 may be performed using a result of semaphore controller 143 detecting a transaction issued from each of the first and second atomic sequencers 141 and 142. The semaphore may be released by the first and second atomic sequencers 141 and 142, independently.

An example embodiment of the inventive concepts is illustrated as the semaphore bit value 144 is formed of two bits. However, the scope and spirit of the inventive concepts is not limited thereto. For example, the semaphore bit value 144 may be formed of one bit. In at least one example embodiment, a semaphore may be assigned to the first atomic sequencer 141 when the semaphore bit value 144 has a logical value of "1", and the second atomic sequencer 142 may occupy the semaphore when the semaphore bit value 144 has a logical value of "0". It may be comprehended that the semaphore bit value 144 is formed of a plurality of bits or a plurality of logical states to assign the semaphore to a plurality of atomic sequencers.

Figure 3:
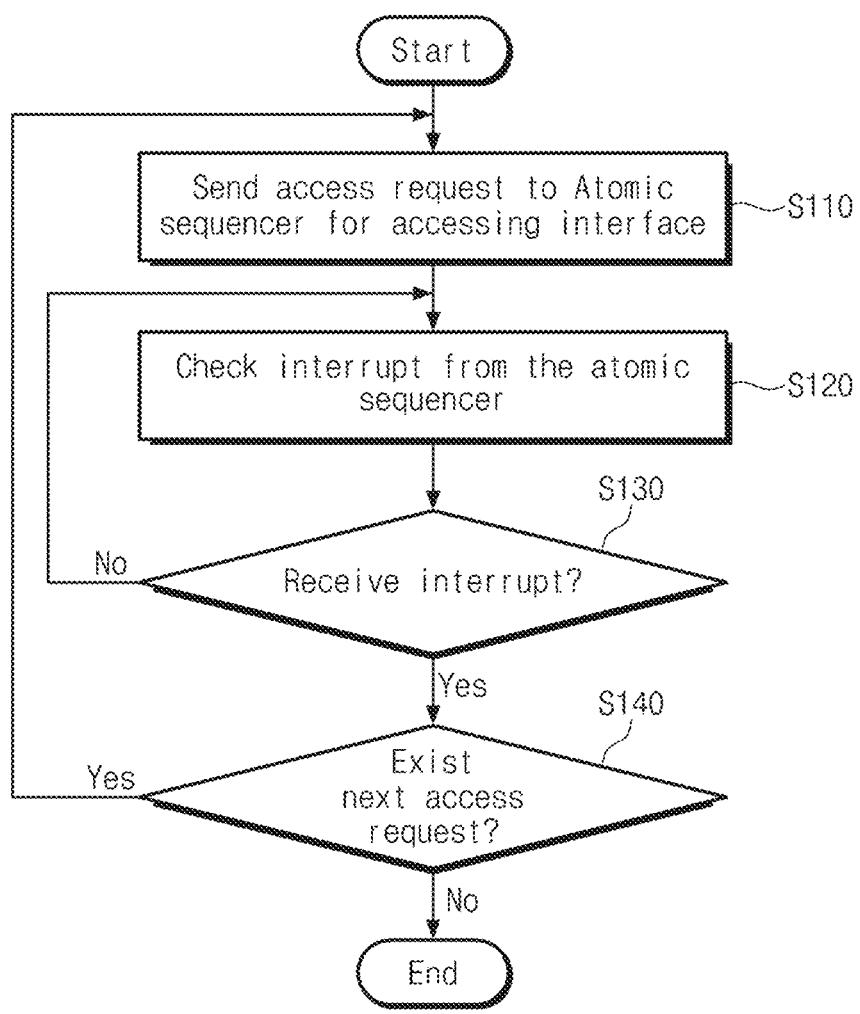
FIG. 3 is a flowchart schematically illustrating an operation of a master included in a system on chip with a semaphore function, according to at least one example embodiment.

FIG. 3 is a flowchart schematically illustrating an operation of a master 110 or 120 included in a system on chip 100 with a semaphore function according to at least one example embodiment. Referring to FIG. 3, if an access request for accessing an interface 150 is issued, each of masters 110 and 120 sends a relevant access request to a corresponding atomic sequencer. Here, for the sake of clarity, an operation of the first master 110 will be described, but is not limited hereto. For example, the second master 120 may also operate the same manner as described with reference to FIG. 3.

In operation S110, the first master 110 tries to request an access to the interface 150 to access a slave device 160. For this, the first master 110 sends an access request for a relevant operation to a first atomic sequencer 141 of a semaphore unit 140 through a bus matrix 130. The access request issued from the first master 110 may be programmed at a register that the first atomic sequencer 141 includes.

In operation S120, the first master 110 detects whether a request of the first atomic sequencer 141 about an access to the interface 150 is completed, that is, an interrupt. The first atomic sequencer 141 acquires the semaphore about the interface 150 and executes an atomic sequence including a plurality of transactions for processing the access request from the first master 110. If the atomic sequence is completed, the first atomic sequencer 141 releases the semaphore. In addition, if the atomic sequence is completed, the first atomic sequencer 141 sends an interrupt to the first master 110. The first master 110 monitors and detects the interrupt thus transferred.

In operation S130, the first master 110 determines whether an interrupt is received from the semaphore unit 140. If the interrupt is not received, the method proceeds to operation S120 to detect whether the interrupt is received from the first atomic sequencer 141. If the interrupt is received, the method proceeds to operation S140.

In operation S140, the first master 110 determines whether an access to the interface 150 is additionally requested. If so, the method proceeds to operation S110 to issue an access request. If not, the method ends.

There is described a method where access requests of the masters 110 and 120 about the interface 150 is sent to the semaphore unit 140, according to at least one example embodiment. The masters 110 and 120 have only to send an access request about the interface 150 to the semaphore unit 140 without considering the semaphore. The access requests of the masters 110 and 120 are stored at the semaphore unit 140, and the semaphore is assigned by the semaphore unit 140. The masters 110 and 120 sharing the interface 150 do not need to consider the setting of the semaphore at a software level, but is not limited thereto.

Figure 4:
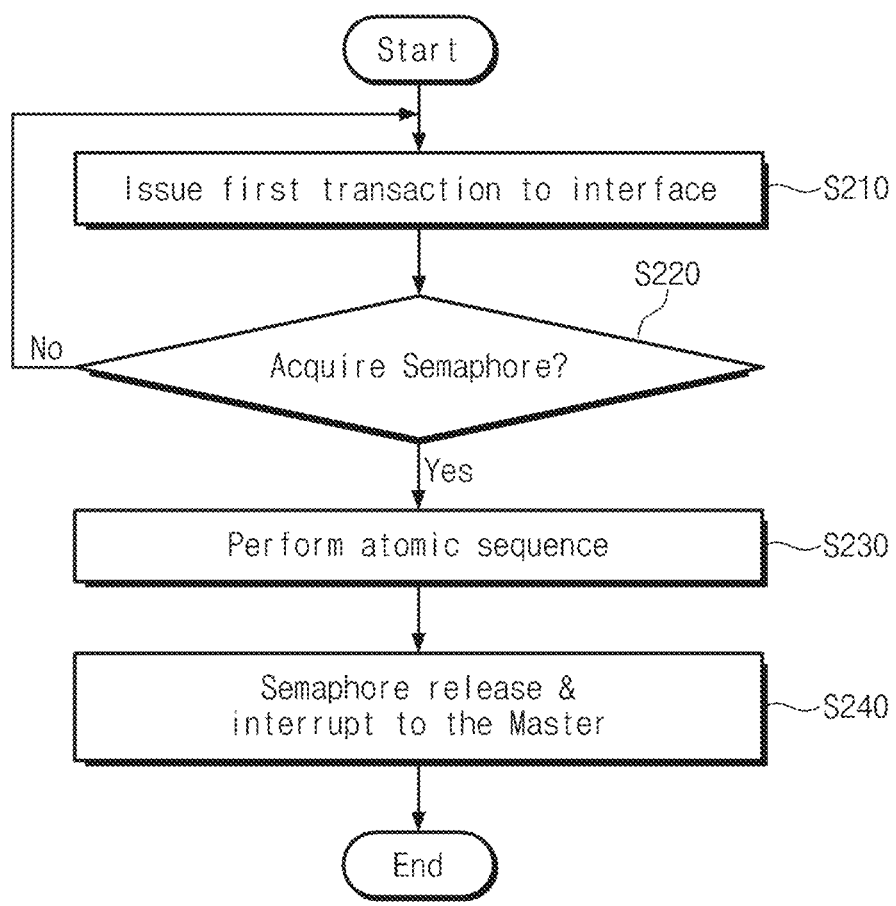
FIG. 4 is a flowchart schematically illustrating an operation of a first atomic sequencer shown in FIG. 2, according to at least one example embodiment.

FIG. 4 is a flowchart schematically illustrating an operation of a first atomic sequencer shown in FIG. 2, according to at least one example embodiment of the inventive concepts. Referring to FIG. 4, a first atomic sequencer 141 acquires the semaphore about an interface 150 according to an access request from a first master 110 and performs an atomic sequence. For the sake of clarity, there is described an operation of the first atomic sequencer 141 that acquires the semaphore and an atomic sequence, but the operation is not limited thereto. Likewise, based on an access request from a second master 120, a second atomic sequencer 142 acquires the semaphore about the interface 150 and performs the atomic sequence, for example.

In operation S210, the first atomic sequencer 141 issues a first transaction for an access request about the interface 150 issued from the first master 110. A semaphore controller 143 determines whether to assign the semaphore to the first atomic sequencer 141, based on the first transaction sent from the first atomic sequencer 141. In the event that the semaphore is not assigned to any one of the first atomic sequencer 141 and the second atomic sequencer 142, the semaphore controller 143 assigns the semaphore to the first atomic sequencer 141 that issues the first transaction. In contrast, in the event that the semaphore is previously occupied by the second atomic sequencer 142, the semaphore controller 143 postpones assigning of the semaphore to the first atomic sequencer 141.

In operation S220, the first atomic sequencer 141 detects a semaphore assignment state of the semaphore controller 143, based on the input of the first transaction. In the event that the first atomic sequencer 141 acquires the semaphore, the method proceeds to operation S230. In contrast, in the event that the first atomic sequencer 141 does not acquire the semaphore, the method proceeds to operation S210 to send the first transaction to the interface 150 again.

In operation S230, the first atomic sequencer 141 performs an atomic sequence to program a control register of the interface 150. The first atomic sequencer 141 may provide the interface 150 with at least one transaction to be performed after the first transaction. The first atomic sequencer 141 may perform a plurality of register programming or reading operations corresponding to the atomic sequence.

In operation S240, if the atomic sequence corresponding to a desired, reduced and/or minimum unit (e.g., an atomic unit) of an access to the interface 150 is terminated, the first atomic sequencer 141 releases a semaphore bit value 144 (refer to FIG. 2) set to the semaphore controller 143. That is, the first atomic sequencer 141 releases a current semaphore occupation state about the interface 150. If the semaphore state is released, the atomic sequence of the first atomic sequencer 141 is terminated.

There is also described an operation of the first atomic sequencer 141 that acquires the semaphore about the interface 150 and performs the atomic sequence, according to at least one example embodiment. Likewise, based on a request of a second master 120, the second atomic sequencer 142 tries to acquire the semaphore about the interface 150 and performs the atomic sequence.

Figure 5A:
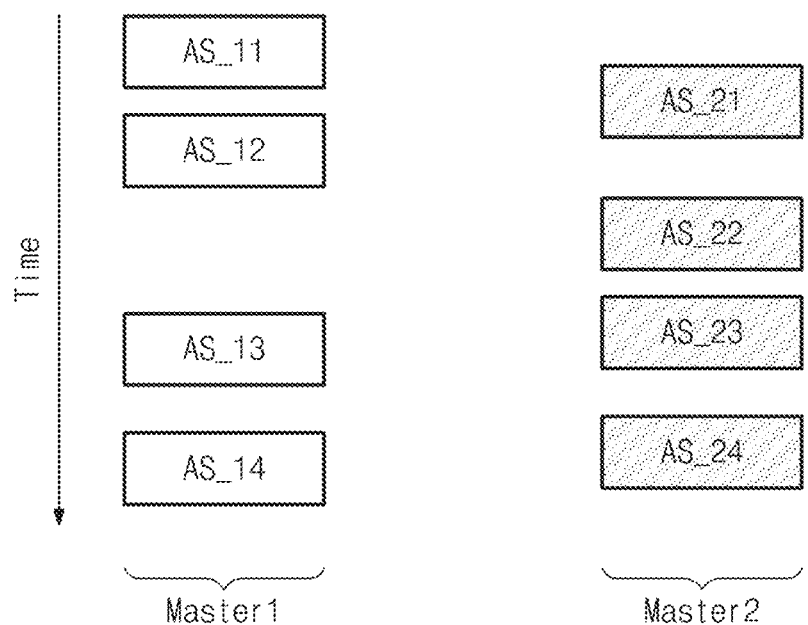
FIGS. 5A and 5B are diagrams schematically illustrating atomic sequences according to assignment of a semaphore, according to some example embodiments.
Figure 5B:
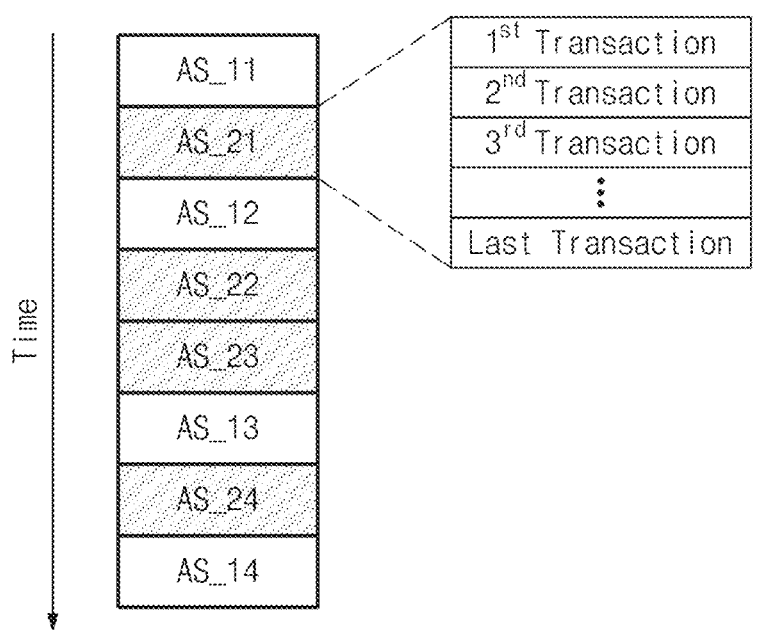

FIGS. 5A and 5B are diagrams schematically illustrating atomic sequences according to assignment of a semaphore, according to some example embodiments. FIG. 5A shows the case where two masters access a slave device through two different interfaces, respectively. FIG. 5B shows an access to a slave device in a structure where one interface is shared by a semaphore unit 140 according to at least one example embodiment of the inventive concepts.

Referring to FIG. 5A, there is illustrated an access operation to a slave device when masters include interfaces, respectively, according to at least one example embodiment. That is, a first interface (not shown) may be provided between a first master 110 and a slave, and a second interface (not shown) may be provided between a second master 120 and the slave. In at least one example embodiment, competition between the first master 110 and the second master 120 for occupying of an interface may not exist. Thus, the masters 110 and 120 may control a slave device 160 using independent interfaces. In at least one example embodiment, however, there may be as many interfaces as masters.

Referring to FIG. 5B, the masters 110 and 120 are connected to a single interface 150 for controlling the slave device 160. That is, the first master 110 and the second master 120 are connected with the interface 150 for controlling the slave device 160. In at least one example embodiment, competition between the first master 110 and the second master 120 for occupying of an interface may exist. A semaphore unit 140 according to some example embodiments of the inventive concepts may arbitrate this competition in a hardware manner, but is not limited thereto, and a transaction occurs between any one master and the slave device 160. That is, the first master 110 may access the interface 150 through atomic sequences AS_11, AS_12, AS_13, and AS_14 carried out by the first atomic sequencer 141. The second master 120 may access the interface 150 through atomic sequences AS_21, AS_22, AS_23, and AS_24 carried out by the second atomic sequencer 142. As the semaphore is adjusted by the atomic sequencers 141 and 142 and the semaphore controller 143, the interface 150 may be shared by a plurality of masters without wasting a waiting time.

In FIG. 5B, there are illustrated transactions constituting the atomic sequence AS_21 that the second atomic sequencer 142 performs, according to at least one example embodiment. A first transaction of the transactions constituting the atomic sequence AS_21 is iteratively sent to the interface 150 to acquire a semaphore. If the semaphore is acquired, transactions following the first transaction may be transferred to the interface 150. During this period, a release or change on the semaphore may be interrupted.

Figure 6:
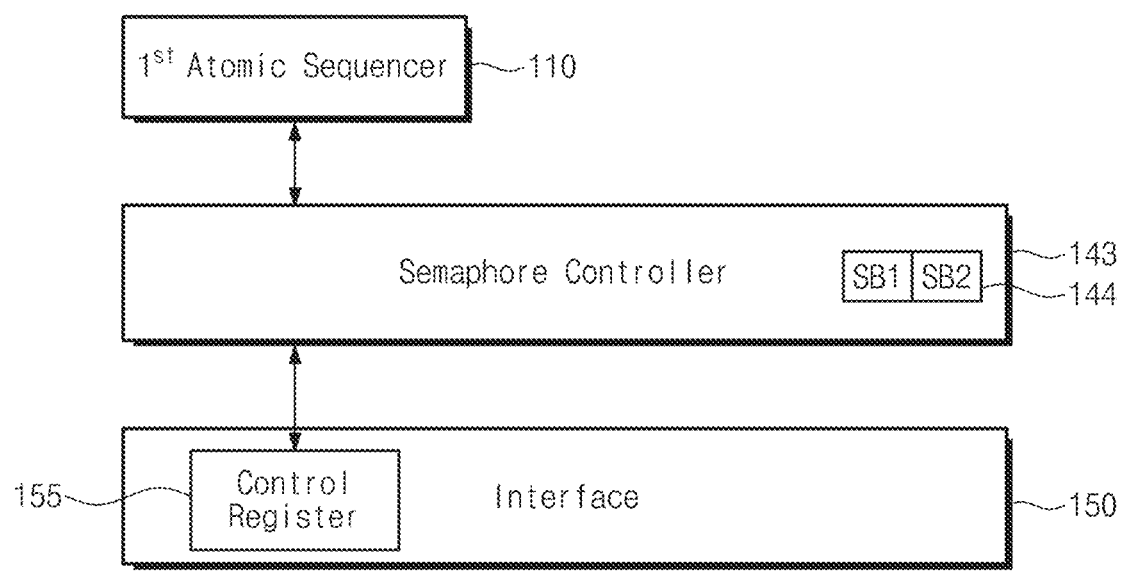
FIG. 6 is a block diagram schematically illustrating an operation of a semaphore controller, according to at least one example embodiment.

FIG. 6 is a block diagram schematically illustrating an operation of a semaphore controller 143 according to at least one example embodiment of the inventive concepts. Referring to FIG. 6, a semaphore controller 143 monitors a transaction to an interface 150 issued from an atomic sequencer 141 and sets a semaphore bit value 144.

When a first master 110 requests an access to the interface 150, the first atomic sequencer 141 generates an operation code corresponding to the access request from the first master 110. A plurality of transactions may need to be exchanged to write a plurality of operation codes for processing the access request from the first master 110 at a control register 155 of the interface 150. A plurality of operation codes for a plurality of transactions is sequentially arranged may correspond to one atomic sequence. Thus, to perform one atomic sequence, the first atomic sequencer 141 acquires a semaphore and then performs an atomic sequence AS corresponding to the access request from the first master 110. Until the semaphore is acquired, the first atomic sequencer 141 repeatedly senses a first transaction of the atomic sequence to the interface 150.

The semaphore controller 143 may monitor transactions issued from the first and second atomic sequencers 141 and 142. In the event that the semaphore is not assigned, the semaphore controller 143 assigns the semaphore to an atomic sequencer that first sends the first transaction to the interface 150. That is, in the event that an atomic sequence of each atomic sequencer is terminated and the semaphore is released, an atomic sequencer that first sends a first transaction may acquire the semaphore.

In the event that the semaphore is released by the first atomic sequencer 141 and the second atomic sequencer 142, the semaphore bit value 144 may be set to "00", for example. Here, it is assumed that a most significant bit (MSB) of the semaphore bit value 144 indicates a semaphore state of the first atomic sequencer 141 and a least significant bit (LSB) thereof indicates a semaphore state of the second atomic sequencer 142. With this assumption, if a first transaction is first transferred from the second atomic sequencer 142, the semaphore controller 143 may set the semaphore bit value 144 to "01". Also, the semaphore controller 143 maintains the semaphore bit value 144 set to "01" until an atomic sequence of the second atomic sequencer 142 is terminated. Even though a transaction is issued from the first atomic sequencer 141 under the condition that a release of the semaphore bit value 144 is not requested by the second atomic sequencer 142, the semaphore bit value 144 is fixed to "01". In the event that the second atomic sequencer 142 releases the semaphore, the semaphore controller 143 sets the semaphore bit value 144 to "00" and then assigns the semaphore to the first atomic sequencer 141. That is, the semaphore controller 143 sets the semaphore bit value 144 to "10" after the semaphore is released.

After acquiring the semaphore, the first atomic sequencer 141 programs a plurality of operation codes corresponding to an atomic sequence at the control register 155 of the interface 150. Accordingly, the interface 150 performs a data transfer or control operation about the slave device 160 according to the programmed codes.

Here, the semaphore bit value may be released when the first atomic sequencer 141 or the second atomic sequencer 142 reads a register, corresponding to a specific address, from among the plurality of registers of the interface 150. Registers of the specific address may be reserved control registers that are not defined by the protocol of the interface 150.

Figure 7:
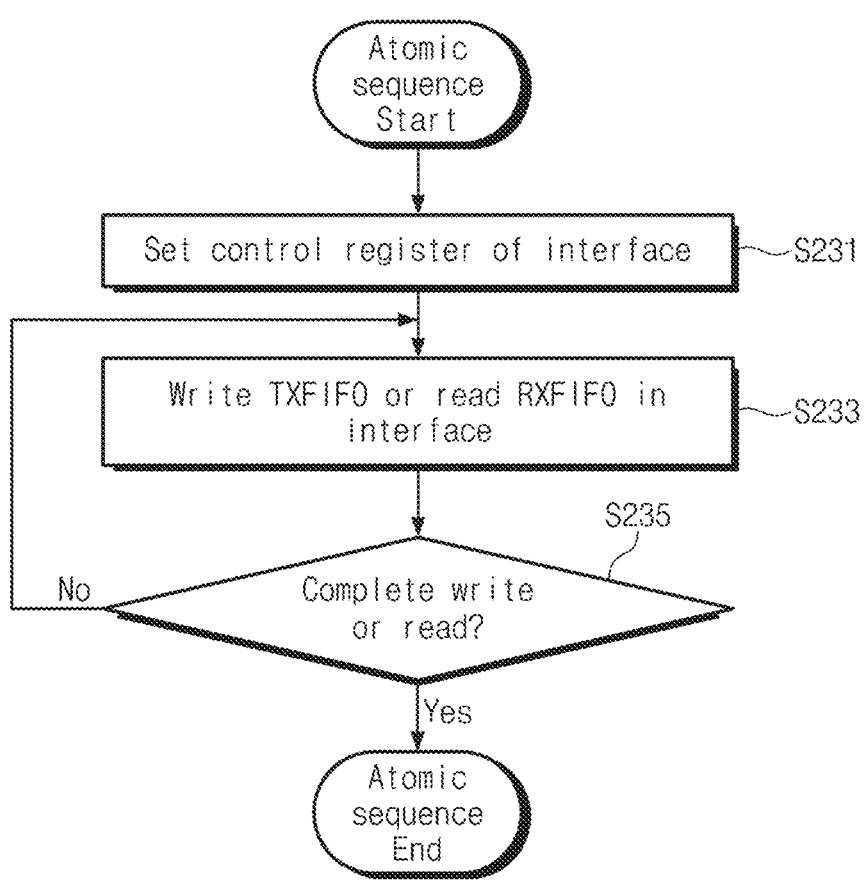
FIG. 7 is a flowchart schematically illustrating an atomic sequence generated between an atomic sequencer and an interface, according to at least one example embodiment.

FIG. 7 is a flowchart schematically illustrating an atomic sequence generated between an atomic sequencer and an interface, according to at least one example embodiment of the inventive concepts. Referring to FIG. 7, an atomic sequencer exchanges a plurality of transactions with an interface 150 to transfer an operation request issued from a master to a slave device. While an atomic sequence corresponding to the operation request is performed, a semaphore about the interface 150 has to be protected without a transfer to other masters. Below, a detailed description on operation S230 of FIG. 4 will be made to describe an example embodiment of an atomic sequence.

In operation S231, a first atomic sequencer 141 sets a control register or a set function register of the interface 150. The number and order of registers of the interface 150 and field values stored at the registers may be programmed by the first atomic sequencer 141. A semaphore may be acquired or rejected by a transaction, first transferred to the interface 150, from among transactions for setting the control register 155 performed in operation S231.

In operation S233, the first atomic sequencer 141 writes transmission data at a transmission FIFO (First-In-First-Out) buffer of the interface 150 or reads data stored at a reception FIFO buffer. The first atomic sequencer 141 may program the number of pieces of data transmitted or received in operation S233.

In operation S235, the first atomic sequencer 141 determines whether a data writing or receiving operation corresponding to one atomic sequence is completed. If a data writing or receiving operation corresponding to one atomic sequence is completed, the atomic sequence is terminated. In contrast, if a data writing or receiving operation corresponding to one atomic sequence is not completed (i.e., it is necessary to transmit or receive data to or from the interface 150 additionally), the method proceeds to operation S233.

With the above-described atomic sequence, the atomic sequencer 141 may use an operation code for transmitting data, a data transfer end operation code, and a control register setting operation code.

Figure 8:
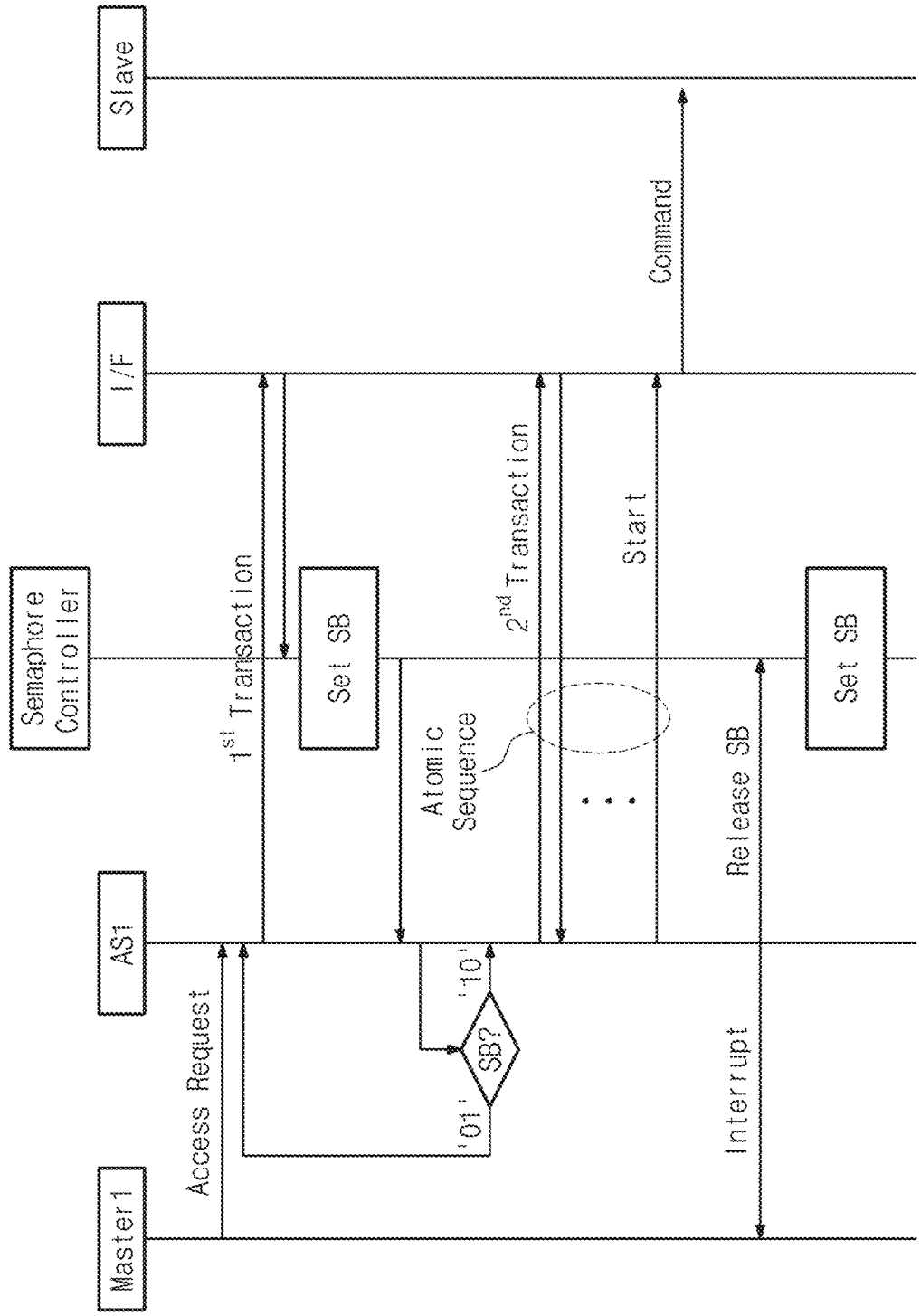
FIG. 8 is a diagram illustrating a semaphore assignment operation according to at least one example embodiment.

FIG. 8 is a diagram illustrating a semaphore assignment operation according to at least one example embodiment of the inventive concepts. Referring to FIG. 8, there are sequentially illustrated interactions between a first master 110, a first atomic sequencer 141, a semaphore controller 143, an interface (I/F) 150, and a slave device 160.

Semaphore assignment and an atomic sequence according to some example embodiments of the inventive concepts may commence as a first master 110 issues an access request about a slave device 160. The first master 110 sends a relevant request to a first atomic sequence AS1 to direct a specific operation to the slave device 160. At this time, registers of a first atomic sequencer 141 (AS1) are set through a bus matrix 130. After a control register of the first atomic sequencer 141 is programmed, the first master 110 orders a start of a relevant operation. An access request of the first master 111 is completed through this procedure.

The atomic sequencer 141 sends a first transaction to the interface 150 through the semaphore controller 143. The semaphore controller 143 receives a response of the interface 150 to the first transaction from the interface 150. That the interface 150 receives the first transaction may mean that the interface 150 remains at an open state. This means that the interface 150 assigns a bus right to the first atomic sequencer 141.

The semaphore controller 143 sets a semaphore assignment state according to a response of the interface 1500 to the first transaction of the first atomic sequencer 141. That is, the semaphore controller 143 sets a semaphore bit value to "10". The semaphore bit value set to "10" is sent to the first atomic sequencer 141.

The first atomic sequencer 141 determines whether to send a transaction following the first transaction to the interface 150 according to a semaphore bit value SB set to the semaphore controller 143. If the semaphore bit value SB set to the semaphore controller 143 indicates that the first atomic sequencer 141 does not acquire a semaphore (SB="01"), the first atomic sequencer 141 postpones a transfer of a next transaction. The first atomic sequencer 141 repeatedly sends the first transaction to the interface 150 to try to acquire the semaphore.

If the semaphore bit value SB set to the semaphore controller 143 indicates that the first atomic sequencer 141 acquires a semaphore (SB="10"), the first atomic sequencer 141 sends a next transaction to the interface 150. That is, transactions following the first transaction are sent to the interface 150. If a last transaction of the atomic sequence is sent to the interface 150, the interface 150 informs the slave device 160 of an operation corresponding to a relevant access request. For example, a command corresponding to the access request is sent to the slave device 160.

Just after sending a last transaction (or, a start code) of an atomic sequence to the I2C interface, the first atomic sequencer 141 releases the semaphore bit value SB of the semaphore controller 143. That is, the semaphore bit value SB is changed from "01" to "00". At the same time, the first atomic sequencer 141 sends an interrupt, indicating that an atomic sequence about the access request is completed, to the first master 110.

As the first atomic sequencer 141 requests a release of the semaphore bit value SB, the semaphore controller 143 sets the semaphore bit value SB to "00".

There are described operations of the semaphore controller 143 and the interface 150 for performing an atomic sequence issued from one atomic sequencer AS1 and an operation of the slave device 160 according to at least one example embodiment. However, the example embodiments are not limited thereto; for example, each of atomic sequencers may issue a first transaction for an atomic sequence. Thus, a semaphore may be assigned to one of a plurality of atomic sequencers, and an atomic sequencer to which the semaphore is assigned performs an atomic sequence. In at least one example embodiment, if the interface 150 remains at a competition state, the semaphore may be provided to any other atomic sequence after the atomic sequence is terminated. Thus, it is possible to predict a waiting time by the atomic sequence. In case of a master that needs to control a slave device in real time, scheduling may be made considering a length of an atomic sequence.

Figure 9:
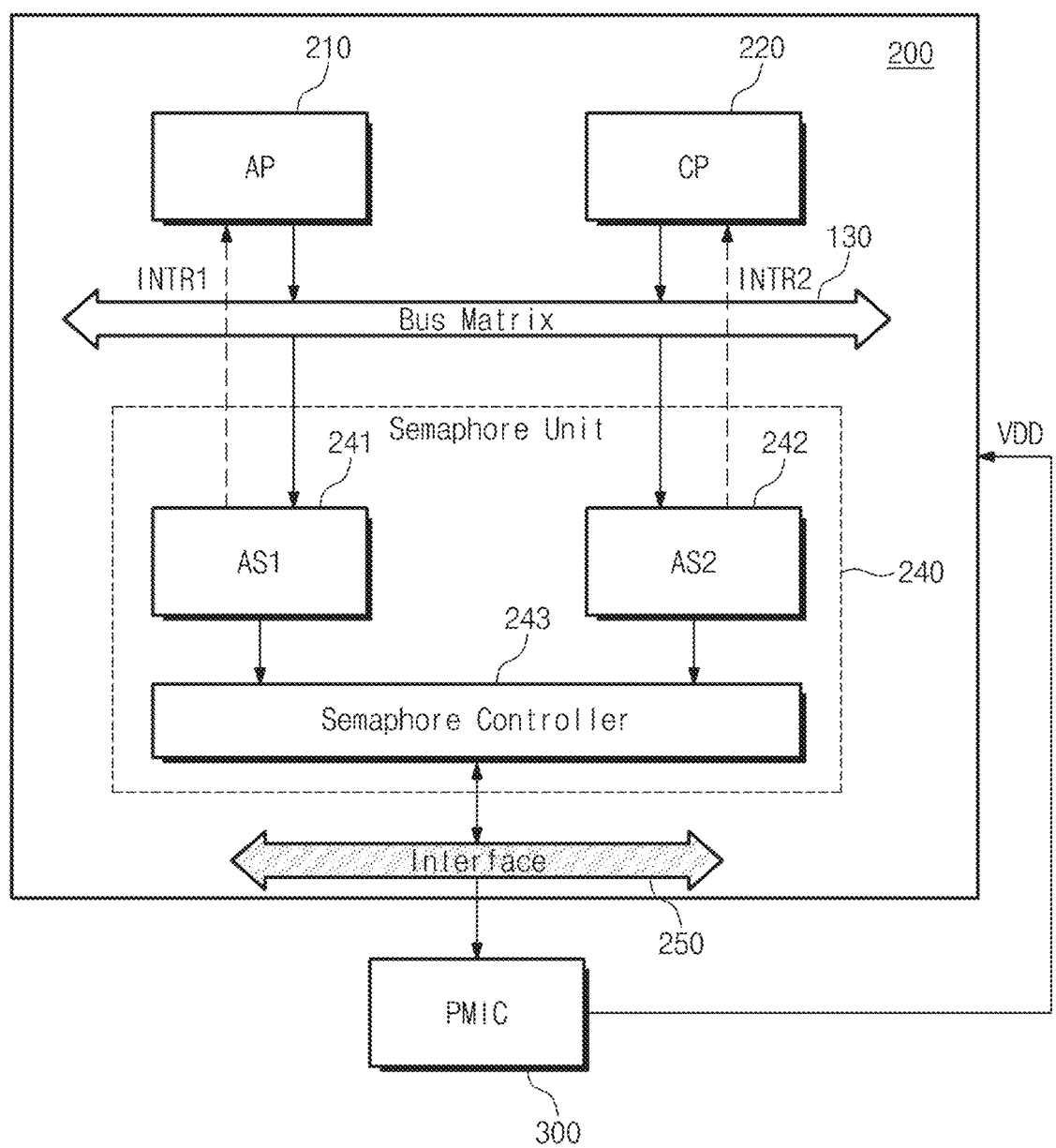
FIG. 9 is a block diagram schematically illustrating a system on chip according to at least one example embodiment.

FIG. 9 is a block diagram schematically illustrating a system on chip according to at least one example embodiment of the inventive concepts. Referring to FIG. 9, a system on chip 200 according to at least one example embodiment of the inventive concepts includes at least an application processor 210 and a communication processor 220. The system on chip 200 controls a power management IC 300 through an interface 250. The system on chip 200 includes at least a bus matrix 230, a semaphore unit 240, and the interface 250, according to at least one example embodiment.

The application processor 210 is a processor that may drive various programs on the system on chip 200. The application processor 210 may execute software (e.g., an application program, an operating system, device drivers, etc.) to be executed on a computing device (e.g., a mobile device, a PC, a tablet device, etc.) that includes the system on chip 200, for example. The application processor 210 may be implemented with a homogeneous multi-core processor or a heterogeneous multi-core processor. The multi-core processor may be a computing component that has two processors (hereinafter referred to as "core") capable of operating independently of each other. In addition, the application processor 210 may be a multimedia processor for controlling a multimedia device such as a camera or a display.

The communication processor 220 may be a processor driven by an operating system of which the attribute is different from that of the application processor 210. The communication processor 220 implemented on the system on chip 200 may be a processor that performs wireless communications with a base station or any other communication devices for voice communications or data communications. The communication processor 220 may be driven by a real-time operating system different from the operating system of the application processor 210. For example, when a call occurs through a wireless communication channel, the communication processor 220 controls any other components in real time to provide a user with a communication service quickly. For scheduling of the communication processor 220, a desired, reduced and/or minimum waiting time has to be determined, calculated, and/or guaranteed with respect to slave devices that the communication processor 220 shares together with the application processor 210. In addition, a length of the waiting time has to be determined, calculated, and/or fixed.

The bus matrix 230 may be a system bus for providing an on-chip network in the system on chip 200. The bus matrix 230 may include a data bus, an address bus, and a control bus, for example. The data bus may be a channel where data is transferred. The data bus may be mainly used as a memory access channel to a working memory (not shown) or a storage device (not shown). The address bus may be a channel for exchanging addresses between IP blocks. The control bus may be a channel where control signals are transferred between IP blocks.

The semaphore unit 240 may be implemented with hardware that allows a plurality of masters to share a single internal bus, the interface 250 without conflict. For example, the semaphore unit 240 postpones accessing of the interface 250 by the communication processor 220 while the application processor 210 occupies the interface 250. That is, during an atomic sequence period where the application processor 210 writes or reads a register of the interface 250, the semaphore unit 240 postpones an access of the communication processor 220. The semaphore unit 240 assigns the priority of the interface 250 to the communication processor 220 after the atomic sequence of the application processor 210 is terminated. The semaphore unit 240 may assign the priority about the interface 150 by the atomic sequence.

For example, the semaphore unit 240 includes at least a first atomic sequencer 241, a second atomic sequencer 242, and a semaphore controller 243, according to at least one example embodiment. The first atomic sequencer 241 manages a request of the application processor 210 about an access to an interface 250. The first atomic sequencer 241 interfaces with the interface 250 for controlling the power management IC 300 according to a request of the application processor 210.

The first atomic sequencer 241 manages a request of the application processor 210 about an access to the interface 250. That is, the first atomic sequencer 241 detects an access request about the interface 250 that is issued from the application processor 210. In the event that the application processor 210 requests an access to the interface 250, the first atomic sequencer 241 sends a first transaction to the interface 250 to acquire the semaphore. In the event that the semaphore is acquired, the first atomic sequencer 241 performs the atomic sequence that is a desired, reduced and/or minimum access unit. When the atomic sequence about the interface 250 is terminated, the first atomic sequencer 241 releases the semaphore about the interface 250 and sends an interrupt INTR1 to the application processor 210. In some example embodiments, the interrupt INTR1 may be sent simultaneously upon the release of the semaphore, but is not limited thereto.

The second atomic sequencer 242 manages a request of the communication processor 220 about an access to the interface 250. In the event that the communication processor 220 requests an access to the interface 250, the second atomic sequencer 242 sends a first transaction to the interface 250 to acquire the semaphore. In the event that the semaphore is acquired, the second atomic sequencer 242 performs the atomic sequence. When the atomic sequence about the interface 250 is terminated, the second atomic sequencer 242 releases the acquired semaphore and sends an interrupt INTR2 to the semaphore controller 243. The first and second atomic sequencers 241 and 242 may access the interface 250 by the desired, reduced and/or minimum operation unit (i.e., a desired operational period) named "Atomic Sequence", based on a semaphore function that the semaphore controller 243 provides.

The semaphore controller 243 detects the first transaction issued from the first and second atomic sequencers 241 and 242 to assign the semaphore. In the event that the semaphore is not assigned to any one of the first and second atomic sequencers 241 and 242, the semaphore controller 243 may assign the semaphore to an atomic sequencer that sends the first transaction. In the event that the semaphore is assigned, the semaphore controller 243 maintains a semaphore assignment state until an atomic sequence is terminated. For example, if the semaphore is occupied by the first atomic sequencer 241, the semaphore controller 243 does not change an assignment state of the semaphore even though a transaction is sent from the second atomic sequencer 242. The assignment state of the semaphore may be changed when an atomic sequence performed by the first atomic sequencer 241 is terminated.

The semaphore controller 243 manages a semaphore bit value for semaphore assignment. That is, the semaphore controller 243 sets a semaphore bit indicting a semaphore assignment state about the first atomic sequencer 241 and a semaphore bit indicting a semaphore assignment state about the second atomic sequencer 242, respectively. For example, the semaphore bit value may be set to "00" when semaphores of the first and second atomic sequencers 241 and 242 are all released. The semaphore bit value may be set to "10" when the semaphore is assigned to the first atomic sequencer 241 and to "01" when the semaphore is assigned to the second atomic sequencer 242. The setting of the semaphore bit value may be performed using a result of the semaphore controller 243 detecting a transaction issued from each of the first and second atomic sequencers 241 and 242. The semaphore bit value is fully described with reference to FIG. 2, and a description thereof is thus omitted.

The interface 250 may interface the system on chip 200 with the power management IC 300. For example, the interface 250 may be an I2C interface that includes one serial data line SDA and one serial clock line SCL and supports bidirectional communication. The communication counterpart may be decided when a bus master appoints a unique address of the communication counterpart. The interface 250 may perform data transmission and reception with randomly designated devices. Also, since the protocol of the interface 250 defines mechanism for avoiding bus competition, a randomly designated device may operate as a master. Thus, in a system using the interface 250, multiple masters manage the power management IC 300.

The power management IC 300 provides the system on chip 200 with a driving voltage VDD according to a control of the system on chip 200. The power management IC 300 is connected with the system on chip 200 through the interface 250 and is controlled thereby. The power management IC 300 may include a plurality of DC-DC converters or voltage regulators. The power management IC 300 may adjust a level of the driving voltage VDD according to a request from the system on chip 200. For example, in a sleep mode, the power management IC 300 may provide the system on chip 200 with the driving voltage VDD0 having a relatively low level according to a request of the system on chip 200. At a wake-up event, the power management IC 300 raises a level of the driving voltage up to a level VDD2 for a specific operation according to a request of the system on chip 200.

Events, such as wake-up for example, may indicate an event that a call sign for voice communications is sent from the communication processor 200 to a user. At this time, based on a request of the communication processor 220, the power management IC 300 may increase an operating voltage up to a level enough to provide the user with a call sign or vibration. The semaphore unit 240 may permit the communication processor 220 to acquire a semaphore about the power management IC 300 within a desired, reduced, and/or minimum waiting time. In addition, the semaphore is acquired by the atomic sequence, thereby making it possible to request an access to the power management IC 300 quickly.

Figure 10:
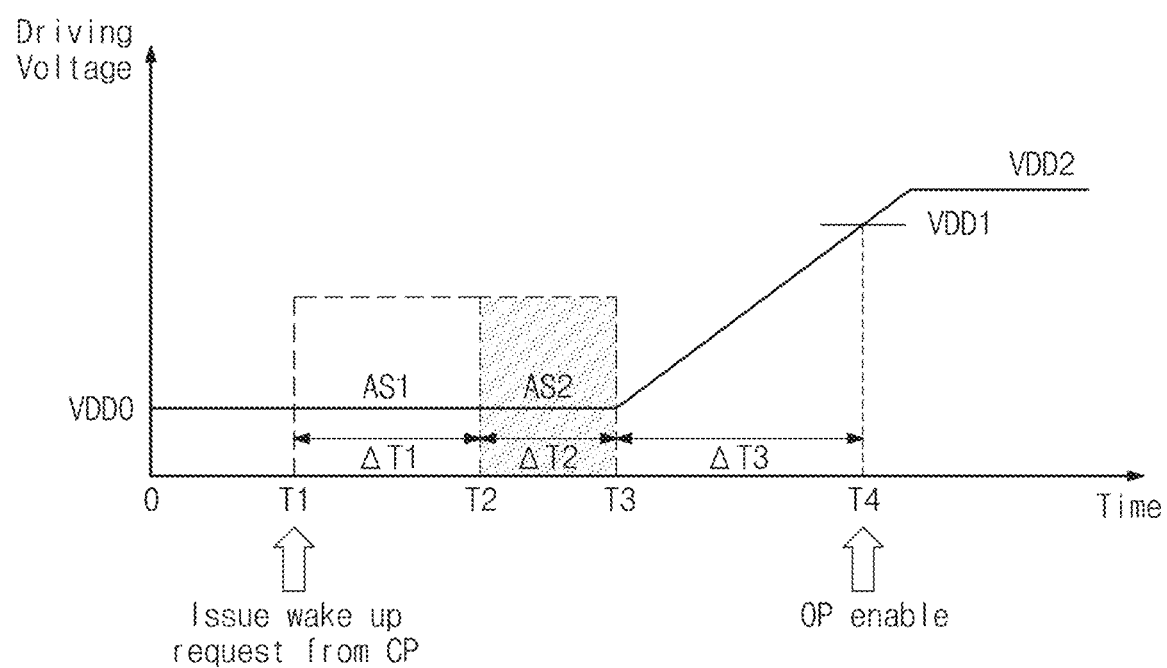
FIG. 10 is a timing diagram showing an increase in a driving voltage according to atomic sequences of a system on chip and a power management IC, according to at least one example embodiment.

FIG. 10 is a timing diagram showing an increase in a driving voltage according to atomic sequences of a system on chip 200 and a power management IC 300, according to at least one example embodiment of the inventive concepts. Referring to FIG. 10, it is assumed that a system on chip 200 remains at a sleep mode and a power management IC 300 provides the system on chip 200 with a driving voltage VDD0 having a level enough to maintain the sleep mode. Also, it is assumed that a semaphore of an interface 250 is assigned to an application processor 210.

At time T1, a communication processor 220 of the system on chip 200 requests wake-up at the power management IC 300. An atomic sequencer 242 corresponding to the communication processor 220 sends a first transaction for acquiring the semaphore to the interface 250. As an operation requested by the application processor 220 is processed, the semaphore is currently occupied by a first atomic sequencer 241. Thus, the semaphore may be assigned to the second atomic sequencer 242 at time T2 when the atomic sequence AS1 is completed. Before time T2, the first atomic sequencer 241 processes a plurality of transactions corresponding to the atomic sequence AS1 and releases a semaphore bit value.

At time T2, the interface 250 receives the first transaction that the second atomic sequencer 242 repeatedly sends to acquire the semaphore. Thus, the semaphore bit value is set to designate the second atomic sequencer 242. If the atomic sequence AS2 of the second atomic sequencer 242 commences, a plurality of transactions corresponding to a request for increasing a voltage level may be issued to the power management IC 300. If a final transaction of the atomic sequence AS2 is sent to the interface 250, the interface 250 provides the power management IC 300 with a control command or signal.

At time T3, the power management IC 300 increases a level of the driving voltage VDD in response to the control command transferred through the interface 250. If a desired, reduced and/or minimum level of the driving voltage VDD for wake-up is a first level VDD1, the wake-up of the system on chip 200 is activated after time T4.

At time T4, a driving voltage provided by the power management IC 300 may rise over the first level VDD1. Afterward, an overall operation for waking up the system on chip 200 may be performed.

As described above, a request of the communication processor 220 about an access to the power management IC 300 may be issued after a time ΔT1 corresponding to the atomic sequence AS1 that is performed by the application processor 210. A level of the driving voltage VDD may rise after a time ΔT2 corresponding to the atomic sequence AS2 that is performed between the second atomic sequencer 242 and the interface 250. Also, that a normal operation is possible means that a time ΔT3 is additionally required until a level of the driving voltage VDD reaches "VDD1". According to some example embodiments of the inventive concepts, the semaphore may be assigned by the atomic sequence, thereby preventing a master, necessitating real-time control, from waiting blindly.

The worst case waiting time when a request of the communication processor 220 about an access to the power management IC 300 is transferred to the power management IC 300 may be an atomic sequence AS1 of the first atomic sequencer 241 corresponding to the application processor 210. As lengths of atomic sequences of the communication processor 220 are used, task scheduling may be easily made with respect to various operations necessitating real-time control.

Figure 11:
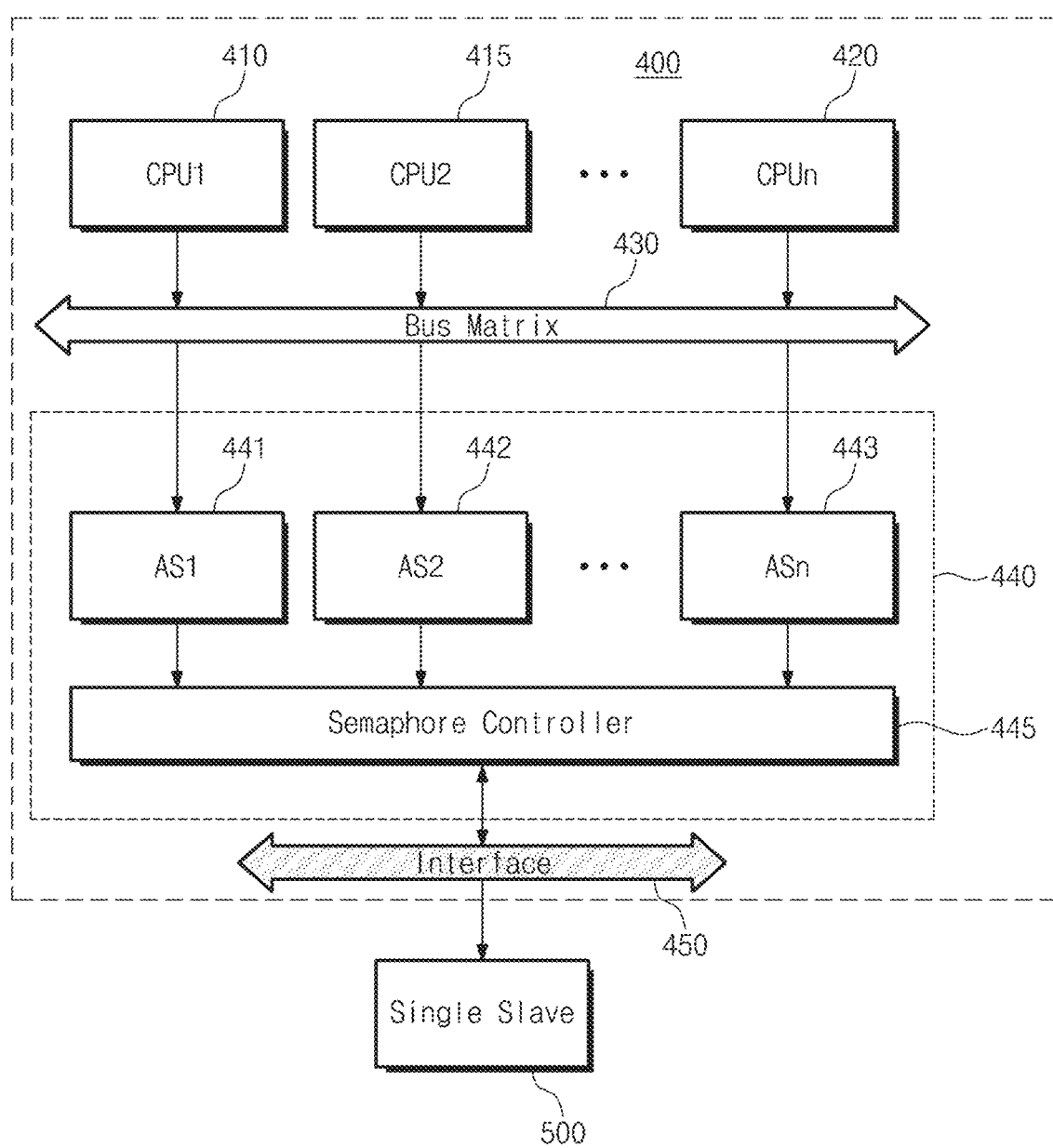
FIG. 11 is a block diagram schematically illustrating a system on chip according to at least one example embodiment.

FIG. 11 is a block diagram schematically illustrating a system on chip according to still at least one example embodiment of the inventive concepts. Referring to FIG. 11, a system on chip 400 includes at least a plurality of processors 410, 415, and 420 corresponding to masters of an interface 450 and a semaphore unit 440 to control a semaphore about each processor. A single slave 500 that uses the processors 410, 415, and 420 as a master is connected through the interface 450, however the example embodiments are not limited thereto and there may be a plurality of slave devices shared by a plurality of master devices, according to inventive concepts presented herein.

The processors 410, 415, and 420 may be processors driven by operating systems having different attributes, or the same attributes. Also, the processors 410, 415, and 420 may be processors driven by operating systems having different security levels, or the same security levels. In software driven on each of the processors 410, 415, and 420, an access to the single slave 500 is requested at the semaphore unit 440 through a bus matrix 430 without considering a semaphore.

The semaphore unit 440 includes at least a plurality of atomic sequencers 441, 442, and 443 to perform atomic sequences about the interface 450 of the processors 410, 415, and 420 and a semaphore controller 445. Each of the atomic sequencers 441, 442, and 443 sends a request of a corresponding processor about an access to the interface 450 to the interface 450 according to a control of the semaphore controller 445. When receiving an access request about the interface 450, each of the atomic sequencers 441, 442, and 443 acquires a semaphore and sends an access request to the interface 450 by the atomic sequence. The atomic sequencers 441, 442, and 443 releases the semaphore after one atomic sequence is terminated.

The interface 450 act as a channel of an atomic sequence performed by one, acquiring the semaphore, from among the atomic sequencers 441, 442, and 443. That is, a register of the interface 450 is programmed by an atomic sequence that is performed by one, acquiring the semaphore, from among the atomic sequencers 441, 442, and 443. The interface 450 may provide the single slave 500 with a command or a control signal according to a value programmed at the register.

In the system on chip 400, the processors 410, 415, and 420 may share one slave as a semaphore is assigned by an operation unit (i.e., a desired operational period) named "atomic sequence". The system on chip 400 includes the semaphore unit 440 to assign the semaphore. Under a control of the semaphore unit 440, the processors 410, 415, and 420 may occupy the interface 450 by the atomic sequence. A desired, increased and/or maximum time when any one processor occupies the interface 450 may be determined and/or fixed by intervention of the semaphore unit 440, and the semaphore of the interface 450 is released when the fixed occupation time passes. Thus, as a time when any one processor occupies the interface 450 is predicted, it is possible to provide facility of scheduling to a master necessitating real-time control about the single slave 500.

A memory system according to at least one example embodiment of the inventive concepts may be packaged according to any of a variety of different packaging technologies. Examples of such packaging technologies may include the following: PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP), etc.

A semaphore about an interface to be shared is configured using added hardware, thereby making it possible for masters to drive one slave efficiently. In addition, when a master accesses a slave, a waiting time of any other master is determined and/or fixed, thereby improving scheduling and/or making scheduling easier.

The units and/or modules described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, or computer storage medium or device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A system on chip (SoC) comprising:
   a first master;
   a second master;
   an interface configured to provide communication between an external device and the first master and/or provide communication between the external device and the second master; and
   a controller configured to
      receive a first request to access the interface from the first master and a second request to access the interface from the second master,
      determine a first operational period for the first master in response to the first request and a second operational period for the second master in response to the second request,
      schedule the first master to have access to the interface for the first operational period and the second master to have access to the interface for the second operational period, and
      release a semaphore assigned to one of the first master and the second master when an atomic sequence of the one of the first master and the second master is completed,
   wherein the interface uses a serial data line and a serial clock line for the communication, and
   wherein the external device is shared by the first master and the second master via I2C (Inter-Integrated Circuit) interface protocol.

2. The SoC of claim 1, wherein
   the first master is driven by a real time operating system, and
   the second master is driven by a non-real time operating system.

3. The SoC of claim 1, wherein
   the interface is shared by the first master and the second master, and
   the interface is configured to interface the first master and the second master with the external device.

4. The SoC of claim 1, wherein the controller is configured to allow the first master and the second master to share the interface, and configured to allow the first master and the second master to access the external device.

5. The SoC of claim 1, wherein the controller is configured to execute an atomic sequence corresponding to the first request or the second request.

6. The SoC of claim 1, wherein the controller includes:
   a first atomic sequencer configured to manage the first request for accessing to the interface; and
   a second atomic sequencer configured to manage the second request for accessing to the interface.

7. The SoC of claim 6, wherein the controller is configured to assign a priority either to the first atomic sequencer or the second atomic sequencer.

8. The SoC of claim 6, wherein the controller is configured to assign a semaphore to the first atomic sequencer or to the second atomic sequencer.

9. The SoC of claim 1, wherein when the second request is not granted, the second master is configured to resend the second request.

10. The SoC of claim 1, wherein the first master is an application processor and the second master is a communication processor.

11. A system on chip (SoC) comprising:
a plurality of masters;
an interface configured to provide communication between an external device and the plurality of masters; and
a multi-master controller configured to
receive requests from the plurality of masters for accessing the interface,
manage the requests by scheduling each of the plurality of masters to have access to the interface for a respective operational period, and
release a semaphore assigned to one of the master when an atomic sequence of the one of the plurality master is completed,
wherein the interface uses a serial data line and a serial clock line for the communication,
wherein the external device is shared by the plurality of masters via I2C (Inter-Integrated Circuit) interface protocol, and
wherein the multi-master controller is configured to execute an atomic sequence corresponding to each of the plurality of masters.

12. The SoC of claim 11, wherein the plurality of masters comprise at least one master driven by a real time operating system and at least one master driven by a non-real time operating system.

13. The SoC of claim 11, wherein the interface is shared by the plurality of masters, and the interface is configured to interface each of the plurality of masters with the external device.

14. The SoC of claim 11, wherein
the interface is shared by the plurality of masters, and
the interface is configured to interface the plurality of masters with the external device.

15. The SoC of claim 11, wherein the multi-master controller is configured to execute an atomic sequence corresponding to a first request or a second request from among the requests.

16. The SoC of claim 11, wherein the multi-master controller includes:

a first atomic sequencer configured to manage a first request, from among the requests, for accessing to the interface; and
a second atomic sequencer configured to manage a second request, from among the requests, for accessing to the interface.

17. The SoC of claim 16, wherein the multi-master controller is configured to assign a priority either to the first atomic sequencer or the second atomic sequencer.

18. The SoC of claim 16, wherein the multi-master controller is configured to assign a semaphore to the first atomic sequencer or to the second atomic sequencer.

19. The SoC of claim 11, wherein at least one of the plurality of masters is an application processor or a communication processor.

20. A device comprising:
a first master;
a second master;
an interface configured to provide communication between a slave and the first master and/or provide communication between the slave and the second master; and
a controller configured to
receive a first request to access the interface from the first master and a second request to access the interface from the second master,
determine a first operational period for the first master in response to the first request and a second operational period for the second master in response to the second request,
schedule the first master to have access to the interface for the first operational period and the second master to have access to the interface for the second operational period, and
release a semaphore assigned to one of the first master and the second master when an atomic sequence of the one of the first master and the second master is completed,
wherein the interface uses a serial data line and a serial clock line for the communication, and
wherein the interface is shared by the first master and the second master via I2C (Inter-Integrated Circuit) interface protocol.

* * * * *